J. Bernheisel, Sr.,
Lifting Jack,
N° 81,167. Patented Aug. 25, 1868.

Witnesses:

Inventor,
Jacob Bernheisel
By his Atty.

United States Patent Office.

JACOB BERNHEISEL, SR., OF GREEN PARK, PENNSYLVANIA.

Letters Patent No. 81,467, dated August 25, 1868.

IMPROVEMENT IN LEVER-JACK.

*The Schedule referred to in these Letters Patent and making part of the same.*

TO ALL WHOM IT MAY CONCERN:

Be it known that I, JACOB BERNHEISEL, Sr., of Green Park, Perry county, and State of Pennsylvania, have invented an "Imprved Lever-Jack;" and I hereby declare the following to be an exact description thereof, reference being had to the accompanying drawings, and to the letters of reference marked thereon, making a part of this specification, in which—

Figure 1:
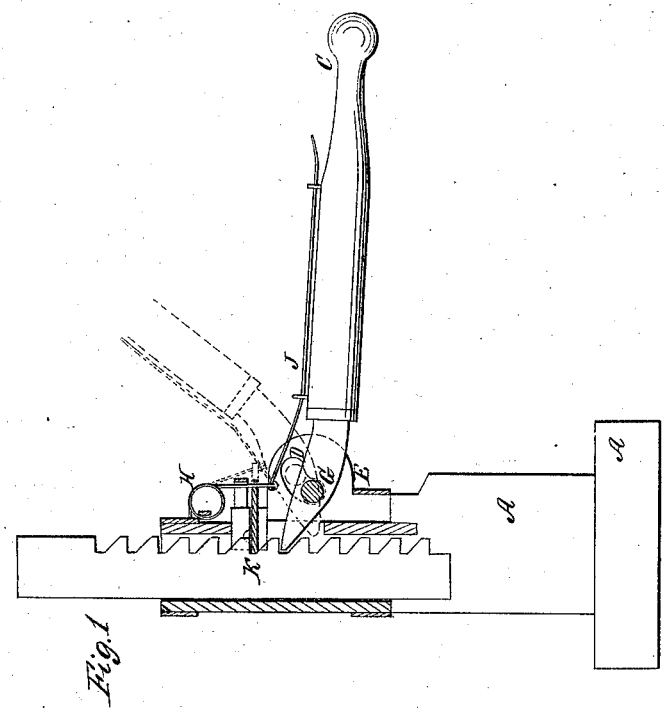

Figure 1 represents a side elevation of the lever-jack.

Figure 2:
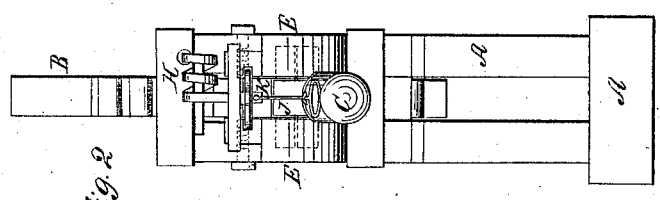

Figure 2, a front view of the same.

Figure 3:
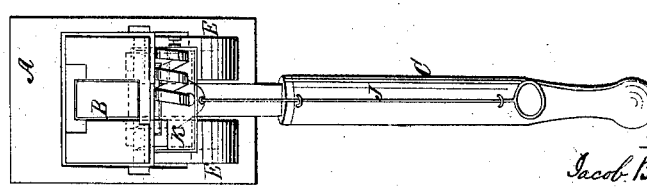

Figure 3, a top view.

The nature of my invention consists in the construction and arrangement of a spring attached to a self-moving slide, connected with the main lever, the pivot of which operates in a curved oval slot, that enables the lever to be easily raised and lowered, so as to hook into the upright rack.

A represents the frame; B, the upright rack that operates in the centre of the frame; C, the main lever, by means of which the rack B is raised. D is a curved oval slot on the inside of the jaws E, in which the pivot G of the lever C operates up and down, so as to get the proper purchase on the rack. H is a coiled spring, the one end of which is attached to the top of the frame A, and the other end to a lever-rod, J, that operates on top of the main lever, C. The spring operates in a slot in the front end of the horizontal slide K, the slide K being for the purpose of catching into the teeth of the rack and holding it up whilst the lever C is being operated; the object of the rod J being to press the slide K into each tooth of the rack during the operation of the lever C. L is a guard, to prevent the spring from throwing the slide K out of its place.

What I claim as my invention, and desire to secure by Letters Patent, is—

The coiled spring H, the slide K, and the curved oval slot D, in which the pivot G of the lever C works, when arranged, constructed, and operating as herein described and for the purpose set forth.

JACOB BERNHEISEL, SR.

Witnesses:
GEO. A. GIBSON,
WM. RICE.